United States Patent Office 3,629,187
Patented Dec. 21, 1971

3,629,187
DENTAL COMPOSITIONS CONTAINING ADDUCT OF 2,2' - PROPANE BIS 3-(4-PHENOXY)-1,2-HYDROXY PROPANE - 1 - METHACRYLATE AND ISOCYANATE
Duncan E. Waller, Milford, Del., assignor to Dentsply International Inc., York, Pa.
No Drawing. Filed June 25, 1969, Ser. No. 836,650
Int. Cl. A61k 5/02; C08f 45/10
U.S. Cl. 260—41 R        29 Claims

ABSTRACT OF THE DISCLOSURE

Dental compositions are provided, including dental cements, dental cavity liners and composite restorative materials, wherein an adduct of 2,2-propane bis[3-(4-phenoxy)-1,2-hydroxy propane-1-methacrylate] and an isocyanate or diisocyanate is present in the liquid and or solid phase constituting such dental product.

Such adducts provide low polymerization shrinkage, good copolymerization and cross-linking capabilities, freedom from irritation in the oral environment and exceptional strength characteristics.

---

The present invention relates to improved dental compositions and products; more particularly, the present invention relates to such improved dental compositions and products, e.g., composite restorative materials, dental cements, dental cavity liners, etc., wherein such dental products and compositions contain, in the solid or liquid phase, an adduct of 2,2'-propane bis[3-(4-phenoxy)-1,2-hydroxy propane-1-methacrylate] and an isocyanate or diisocyanate.

It is of course well known that in recent years polymerizable plastic materials have come to the forefront in their use in various dental compositions and products, including, among others composite restorative materials, dental cements, dental cavity liners, etc. Thus, while various conventional amalgam materials and cements based upon silicate are still widely used in various dental applications, there is an ever increasing employment of plastics, and particularly composites of plastics and various refractory fillers. Accordingly, the dental field is always and continuously looking for new plastics which can improve the physical characteristics of various dental products and compositions.

The use of synthetic plastics is particularly prominent in composite dental restorative materials. In this regard, by definition, a restorative material must restore the appearance, as well as the function of a defective tooth crown so that a number of restrictions are generally placed upon suitable materials. First of all, the material used should have a light yellow color and should be translucent so as to match the tooth color and translucency as much as possible. This, of course rules out metals and highly opaque materials but allows for the advantageous utilization of a number of plastic materials.

In addition, to restore the normal function of the defective tooth crown, the materials employed in the dental restorative material must compare favorably with the natural tooth crown in strength, stiffness and dimensional stability. During mastication, strength and stiffness maintain the integrity of the material and support the remaining tooth structure. This, accordingly, rules out soft, rubbery materials. Similarly, the requirement for adequate dimensional stability precludes materials that are appreciably soluble in the aqueous environment of the mouth and materials that are abraded more readily than dental enamel. This, accordingly, rules out silicate and zinc phosphate cements which, because of their solubility and low strength, cannot restore the function of teeth for long periods.

Additionally, it has been previously found that unreinforced organic polymers or plastic materials are generally not satisfactory as restorative materials. Thus, the failure of such organic polymers or plastics to serve as reliable restorative materials over extended periods of time appears to be related, at least in part, to the shrinkage characteristics of such materials and their lack of effective abrasion resistance.

Accordingly, as previously noted, with respect to restorative materials as well as other dental applications, e.g., dental cements, etc., there has been a great deal of reliance on filled plastic materials, that is, organic polymers or plastics containing a particulate filler, e.g., a refractory filler.

With respect to the requirements of the organic polymer or plastic binder employed in such composite dental products, mention is made of the need for rapid and complete polymerization under the conditions existing in the oral environment, low shrinkage during polymerization, low water absorption, low toxicity and satisfactory strength characteristics. A class of materials which have been found particularly satisfactory to date can be characterized as monomers which contains a polymerizable methacrylate group on each end of a long connecting segment. Thus, a suitable monomeric material now conventionally employed in composite restorative compositions, dental cements and similar dental compositions comprises 2,2-propane bis[3-(4-phenoxy) - 1,2 - hydroxy propane-1-methacrylate].

In accordance with the present invention, however, it has been found that such dental compositions can be improved with respect to their physical characteristics by employing as the polymerizable monomer an adduct obtained by the inter-action of 2,2-propane bis[3-(4-phenoxy)-1,2-hydroxy propane-1-methacrylate] with an isocyanate or diisocyanate. Such an adduct has been found to be particularly advantageous as the polymerizable constituent of composite dental restorative materials, dental cements dental lacquers and cavity liners.

The use of such adducts as the polymerizable constituent, the majority of such adducts being solids, has certain advantages over the employment of the methacrylate from which such adduct is prepared or other conventionally employed polymerizable materials. Thus, for example, some advantages of the employment of the adduct of the present invention include: (a) an ability to be employed as the major constituent of many dental formulations due to the solid nature of the majority of the adducts of the present invention, (b) a low polymerization shrinkage due to the comparatively rigid molecular structure and high molecular weight of the polymerization product of such adduct, particularly when compared to most of the polymerizable materials currently utilized in dental applications, (c) an ease of attainment of a high degree of purity, particularly freedom from traces of intermediate materials employed during synthesis, (d) good copolymerization and cross-linking characteristics due to the retained dimethacrylate structure, (e) ready polymerization characteristics employing a wide variety of catalyst systems, including good working properties easily obtained by control of the catalyst proportions, (f) excellent freedom from tissue irritation, and (g) ease of mixing due to the extremely friable nature of the majority of the adducts of the present invention.

For all of the above reasons, as well as others which will become clear hereinafter, it has been discovered in accordance with the present invention, that excellent dental compositions and products can be provided through the utilization of one or more adducts of 2,2'-propane bis[3-

(4-phenoxy)-1,2-hyroxy propane-1-methacrylate] with an isocyanate or diisocyanate in a solid or liquid phase.

Accordingly it is a principal object of the present invention, to provide novel dental compositions and products which are improved over those conventionally employed.

It is a further object of the present invention to provide such novel dental compositions and products wherein the solid and/or liquid phase thereof contains a novel adduct as the polymerizable constituent.

It is yet a further object of the present invention to provide such a dental compoition wherein such composition contains, as a polymerizable constituent, an adduct of 2,2'-propane bis [3-(4-phenoxy)-1,2 hyroxy propane-1-methacrylate] with an isocyanate or diisocyanate.

A still further object of the present invention comprises a dental composition or product, e.g., a composite dental restorative material, dental cement, dental lacquer, dental cavity liner, etc., wherein such dental product or composition is improved with respect to the prior art through the utilization of a polymerizable constituent in the solid and/or liquid phase comprising a solid adduct obtained from the interaction of 2,2'-propane bis [3-(4-phenoxy)-1,2-hydroxy propane-1-methacrylate] with one or more isocyanates or diisocyanates.

Still further objects and advantages of the novel, dental compositions of the present invention will become more apparent at the following more detailed description of the present invention.

As previously indicated, the above advantages and objects of the present invention are achieved through the provision of a dental composition or product, e.g., a composite dental restorative material, dental cement, dental lacquer, cavity liner, etc., wherein the polymerizable constituent comprises an adduct of 2,2'-propane bis [3-(4-phenoxy)-1,2-hyroxy propane-1-methacrylate] and one or more isocyanates or diisocyanates.

As indicated above, the adducts employed in accordance with the present invention comprise the reaction product of 2,2'-propane bis [3-(4-phenoxy)-1, 2-hydroxy propane-1-methacrylate] with one or more isocyanates or diisocyanates. Suitable monoisocyanates which can be employed in accordance with the present invention include alkyl isocyanates wherein the alkyl group ranges from 1 to about 18 carbon atoms, aryl isocyanates, e.g. phenyl and naphthyl isocyanates and optionally substituted by one or more alkyl or other non-reactive group, and cycloalkyl isocyanates. Thus, for example, suitable mono isocyanates which can be employed in accordance with the present invention include such as:

alkyl isocyanates
   methyl isocyanate
   ethyl isocyanate
   n-butyl isocyanate
   isoamyl isocyanate
   n-amyl isocyanate
   hexyl isocyanate
   n-octyl isocyanate
   isooctyl isocyanate
   dodecyl isocyanate
   octadecyl isocyanate etc.
aryl isocyanates
   phenyl isocyanate
   tolyl isocyanate
   p-ethylphenyl isocyanate
   benzyl isocyanate
   p-cetyl phenyl isocyanate
   p-dodecylphenyl isocyanate
   4-dodecyl-2-methylphenyl isocyanate
   xylyl isocyanate
   α-naphthyl isocyanate
   p-chlorophenyl isocyanate
   m-chlorophenyl isocyanate
cycloalkyl isocyanates
   cyclohexyl isocyanate etc.

Similarly, suitable diisocyanates or polyisocyanates include the alkylene diisocyanates wherein the alkylene group ranges from 2 to about 18 carbon atoms and arylene and substituted arylene di-and polyisocyanates. Thus, exemplary diisocyanates and polyisocyanates include, for example:

alkylene diisocyanates
   ethylene diisocyanate
   propylene diisocyanate
   tetramethylene diisocyanate
   pentamethylene diiocyanate
   hexamethylene diisocyanate
   octamethylene diisocyanate
   decamethylene diisocyanate
   undecamethylene diisocyanate
   dodecamethylene diisocyanate etc.
arylene di- and polyisocyanates
   xylylene-1,4-diisocyanate
   xylylene-1,3-diisocyanate
   m-phenylene diisocyanate
   p-phenylene diisocyanate
   toluene-2,6-diisocyanate
   mesitylene diisocyanate
   durylene diisocyanate
   benzidene diisocyanate
   1-methyl phenylene-2,4 diisocyanate
   naphthylene-1,4-diisocyanate
   naphthylene-1,5-diisocyanate
   1,2,4-benzene triisocyanate
   3,3'-dimethyl-4,4'-diisocyanato diphenyl methane
   4,4'-diphenyl propane diisocyanate
   dianisidine diisocyanate etc.

The adducts employed in accordance with the present invention are generally prepared by the reaction of 2,2'-propane bis[3-(4-phenoxy)-1,2-hydroxy propane-1-methacrylate] with one or more mono or diisocyanates. Where the reaction of the methacrylate monomer is with a mono isocyanate reactant, such reaction is generally carried out by reacting approximately 2 moles of the mono isocyanate per one mole of the methacrylate monomer. This is because the methacrylate monomer employed in production of the adducts has two hydroxyl groups capable of reacting with the isocyanate groups of the other reactant. Thus, for example, the reaction of 2,2'-propane bis [3 - (4 - phenoxy) - 1,2-hydroxy propane-1-methacrylate] with phenyl isocyanate to produce the adduct employed in accordance with the novel dental compositions of the present invention could be represented as follows:

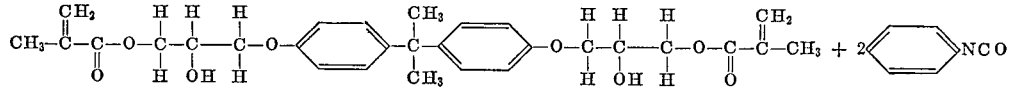
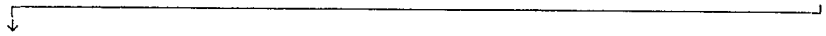
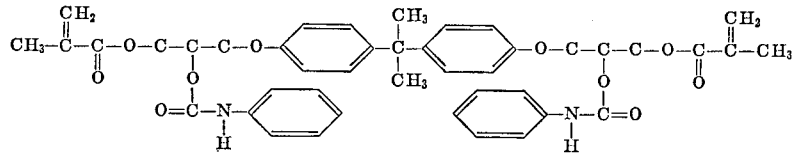

Similarly, an adduct is formed by the reaction of 2,2'-propane bis[3-(4-phenoxy)-1,2-hydroxy propane-1-methacrylate] with a diisocyanate, e.g., toluene diisocyanate, can be represented as follows:

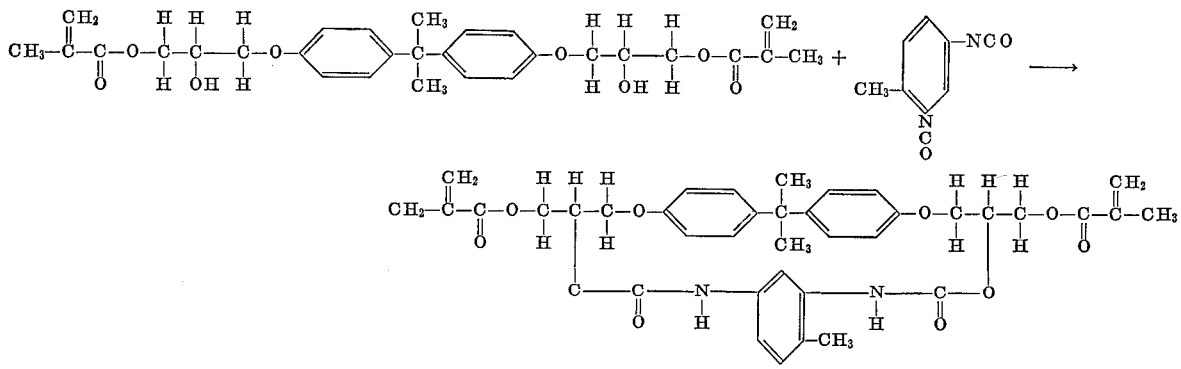

While such reactions illustrated above represent the reaction of 2,2'-propane bis[3-(4-phenoxy)-1,2-hydroxy propane-1-methacrylate] with a single isocyanate or diisocyanate, it should be clear that mixtures of isocyanates can be advantageously employed in accordance with the present invention. Additionally, however, while the above representative illustrations have been shown with respect to the utilization of aromatic isocyanates and diisocyanates, it should be equally clear that any of the foregoing alkyl, cycloalkyl or alkylene isocyanates and diisocyanates can be advantageously employed in the production of the adducts employed in accordance with the novel dental compositions of the present invention.

As indicated previously, one of the advantages of the use of the adducts described above, in accordance with the present invention, is that such adducts are substantially solid materials which provide for an ease in mixing in the preparation of the dental composition. In this regard, it has been discovered in accordance with the present invention, that substantially all of the adducts produced by the reaction of an aromatic mono isocyanate or aromatic diisocyanate are solid materials which can be applicably employed in the solid phase of a composite restorative material or a similar dental product. Similarly, those adducts produced from the reaction of a higher alkyl mono isocyanate or higher alkylene diisocyanate are solid products which, again, can be advantageously employed in the solid phase of the dental composition. In this regard it has been determined that those adducts produced by the reaction of an alkyl or alkylene isocyanate wherein the alkyl or alkylene group contains 6 or more carbon atoms are solid products. Those adducts produced from the lower alkyl or lower alkylene isocyanates are liquid products which can be advantageously utilized in the liquid phase of the dental composition. Whether employed in the solid or liquid phase, however, the use of the adduct as a polymerizable constituent in the composite resorative material, dental cement, dental cavity liner, dental lacquer, etc., provides for an unexpectedly superior product.

While various methods are known for the preparation of adducts by the reaction of a methacrylate monomer and a mono or diisocyanate, the adducts employed in accordance with the novel dental compositions of the present invention are most satisfactorily produced by dissolving the methacrylate monomer, 2,2'-propane bis [3-(4-phenoxy)-1,2-hydroxy propane-1-methacrylate] in cold anhydrous ether and adding to such solution the isocyanate or diisocyanate drop-wise, such isocyanate or diisocyanate also dissolved in cold anhydrous diethyl ether. The reaction of methacrylate monomer and mono or diisocyanate is mildly exothermic and, therefore, the reaction vessel should be fitted with reflux capability to minimize evaporation of the solvent. Stirring of the reactants is continued for a prolonged period, e.g., over- night, following completion of the drop-wise addition of the mono or diisocyanate so as to ensure completion of the reaction. Additional cold anhydrous diethyl ether should then be added to effect separation of the product from the ethereal solution of excess methacrylate monomer which is used to ensure that the end product does not contain any unreacted mono or diisocyanate. When separation has been effected, the reaction mixture may be allowed to settle and the ethereal solution decanted. The crude product may then be washed free of any remaining traces of excess methacrylate monomer by stirring with additional portions of cold anhydrous diethyl ether. While the cold anhydrous diethyl ether has been found to be an exceptional solvent for the production of the adducts employed in accordance with the present invention, it is of course obvious that other solvents can be utilized, the only requirement being that the same be capable of dissolving and allowing reaction of methacrylate and isocyanate materials.

The purified product produced as above may be dried using a high vacuum pump so as to remove all traces of residual ether. The product, thus formed, is a translucent amorphous solid which foams markedly at this stage and is readily pulverized when completely dry to a mass of tiny flakes ready for utilization in the dental compositions of the present invention.

Typical dental compositions which can be produced utilizing the adducts as described above will now be more fully described.

COMPOSITE RESTORATIVE MATERIALS

A composite restorative material is essentially what its name indicates, i.e., a composite material of plastic and a refractory or glass filler which is capable of simulating and restoring the natural functions of the teeth. Such dental restorative materials generally comprise a solid phase consisting of one or more fillers, preferably a mixture of refractory and glass fillers and a liquid phase consisting of a polymerizable monomer or solvent.

Suitable composite dental restorative materials or compositions may be prepared in accordance with the present invention by employing one or more of the adducts of the present invention in the solid and/or liquid phase of the composite material. Preferably, one or more of the solid adducts of the present invention are employed in the solid phase of the composite restorative material with additional fillers of the ceramic and/or glass type. Thus, for example, a suitable solid phase for a dental restorative material in accordance with the present invention, can be prepared by formulating a finely divided mixture of one or more of the adducts of the present invention with from 2½ to about 4 times its weight of powdered ceramic or glass filler of an average particle size of less than about 25 microns, and, in a very minor amount based upon the weight of the composite restorative material, a finely divided polymerization catalyst.

In this respect, it is pointed out that, although the adducts preferably employed in accordance with the present invention are solid materials, such adducts polymerize to effect the setting of the composite material, the polymerization being effected through a catalyst sysem and a liquid phase comprising a further polymerizable solvent. In addition, it has been found in accordance with the present invention, that through the use of two or more solid adducts, or a solid adduct and liquid adduct in accordance with the present invention, it is possible to provide cross-linking of the materials during polymerization and thus provide an even stronger composite material.

As indicated above, the powdered portion of the composite restorative material comprising the adduct of the present invention, a glass and/or ceramic filler and a solid catalyst, is mixed with a liquid system in order to provide the composite restorative material in a state which can be polymerized under the conditions existing in the oral environment. The liquid system to which the powdered composition is added generally comprises a polymerizable liquid solvent and an accelerator for the catalyst system. In such a liquid system, the polymerizable solvent comprises essentially all of the liquid mixed with the powdered composition since the accelerator only comprises a very minor amount. The accelerator is generally one which can effectively bring about free radical decomposition of the catalyst and thus provide a catalyst system which can polymerize and cure the resin under the conditions existing in the oral environment.

Generally, the powdered composition comprising the solid adduct, glass and/or ceramic filler and solid catalyst, is mixed with the liquid system comprising the polymerizable solvent and accelerator in an amount whereby the ratio of solid to liquid is within the range of about 4:1 to about 6:1.

In the preparation of a composite restorative material, in accordance with the present invention, the amounts of catalyst and accelerator are generally fairly critical in that it is an essential characteristic of such materials that the mixture of solid and liquid be such that it is capable of being readily mixed by a dentist yet polymerizes in a short enough period of time that the patient is not inconvenienced and the dentist can proceed with completion of the necessary restoration in the shortest time possible. In viewing of these criteria, a suitable composite restorative material should be one in which the onset of polymerization and curing of the resin portion of the composition begins about 1½ minutes after mixing is initiated on a slab. This allows the dentist approximately 30 seconds to mix the powder and liquid components of the composite restorative material and about 1 minute to manipulate the composition in place before the onset of setting begins. While this is the minimum time at which the setting or curing of the composite restorative composition should begin, it is also important that final curing and final setting be complete within about 4½ to 5 minutes under the conditions existing within the oral environment. This allows a minimum amount of inconvenience to the patient and allows the dentist to complete a restoration in about 10 minutes due to the necessary polishing and grinding after complete setting of the restorative composition. Accordingly, by employing the proper amount of catalyst and accelerator in the composite restorative composition, a product can be prepared which allows the dentist to complete a restoration in approximately 10 minutes.

While various catalyst and accelerator systems can be employed in accordance with the composite restorative compositions of the present invention containing the afore-described adducts, it has been found that the organic peroxides capable of promoting free radical polymerization, are specially preferred materials.

The organic peroxides can be any of the conventionally employed free radical polymerization catalysts, including among others, benzoyl peroxide, lauroyl peroxide, p-chlorobenzoyl, etc. Again, any conventional organic peroxide capable of acting as a free radical polymerization catalyst can be employed in accordance with the present invention. The benzoyl peroxide or similar free radical polymerization catalyst is employed in the solid phase of the composite restorative material since such peroxide catalysts are fully compatible with the filler and adduct system and do not tend to in any way degrade under prolonged periods of storage.

The accelerators which are employed to bring about free radical decomposition of the peroxide catalysts of any of the tertiary amines conventionally employed. Thus, for example, the tertiary amine can comprise a conventional trialkyl amine, e.g., those wherein the alkyl group ranges from about 1 to about 8 carbon atoms, i.e., tri-t-butyl amine, tri-n-butyl amine, trimethyl amine, tri-n-hexyl amine, tri-isooctyl amine, etc; aromatic tertiary amines, e.g., dimethyl-p-toluidene, diethyl p-toluidine, di t-butyl toluidine, dimethyl aniline, diethyl aniline, di-t-butyl aniline etc.

When employing such a peroxide catalyst-tertiary amine accelerator system, the peroxide catalyst generally comprises from about 0.025 to about 0.5% of solid or powder phase while the tertiary amine accelerator generally comprises from about 0.03 to about 0.5% of the liquid phase or polymerizable solvent. Within these ranges, a composite restorative material can be produced which can polymerize under the conditions existing within the oral environment within the previously prescribed time limitations.

In accordance with the present invention, the powder or solid portion of the composite restorative material generally comprises from about 45 to about 85% by weight of a filler, preferably 70 to 83% by weight of the filler, and from about 15 to about 55% by weight, preferably 17 to 30% by weight of the solid adduct of the present invention. The above weights, of course, are exclusive of the catalyst, i.e., the peroxide catalyst, generally present in an amount of from about 0.025 to about 0.5, preferably 0.03 to about 0.04% by weight, based upon the weight of the filler and adduct. Again, within the above ranges, a compatible solid phase is prepared which, when mixed with the polymerizable solvent and accelerator can be cured within the oral environment to a very effective and strong composite restorative material.

Again, the liquid phase of the composite restorative material generally comprises all polymerizable solvent, i.e., 100% polymerizable solvent, with a minor amount of tertiary amine or similar accelerator being present. Again, the accelerator for the peroxide catalyst is generally present in an amount of 0.3 to about 0.5% by weight, preferably 0.4 to about 0.5% by weight based upon the weight of the liquid system.

As indicated above, the filler portion of the composite restorative material can comprise a ceramic and/or glass filler. Preferably the filler comprises both ceramic and glass filler particles having a particle size of less than 25 microns, there being no minimum to the particle size of the filler which can be employed in accordance with the present invention. The use of both a ceramic filler and glass filler allows for a good particle size distribution so that the filler composition may contain both fines and particles nearing the maximum diameter of about 25 microns. Any suitable ceramic filler conventionally employed in composite restorative materials for dental purposes can be advantageously utilized. Suitable examples include, among others, lithium aluminum silicates, quartz, β-eucryptite, alumina, etc. The glass filler can comprise any suitable glass, e.g., silicate glasses, phosphate glasses, etc.

Similarly, the polymerizable solvent can comprise any dental material which acts as a solvent or thinner for the solid phase of the composite restorative material and is capable of polymerizing within the oral environment to a resinous condition which is compatible with the other components of the composite material and is acceptable from a dental stand-point. Such materials are well-known, the major group of the same being the polymerizable acrylic and methacrylic acid derivatives. Thus, for example, suitable polymerizable solvents include the esters of acrylic acid and methacrylic acid, including methylmethacrylate, ethylmethacrylate, butylmethacrylate, methylacrylate, ethylacrylate, butylacrylate, etc. Of course, other polymerizable solvents compatible with the other components of the composite dental restorative material can be advantageously employed in accordance with the present invention. Here again, the essence of the invention does not relate to the various fillers or polymerizable solvents employed, but relates to the fact that it has been discovered that a superior composite restorative material as well as other dental products can be employed by utilizing an adduct of 2,2'-propane bis [3-(4-phenoxy)-1,2-hydroxy propane-1-methacrylate] with a mono- or di-isocyanate.

While the above exemplary description of the composite restorative materials embraced by the present invention has been made with respect to the employment of a catalyst-accelerator system comprising an organic peroxide catalyst and a tertiary amine accelerator, it should be clear that other conventionally employed catalyst systems can be suitably utilized in accordance with the present invention. Thus, for example, a suitable system as set forth above, can contain as the catalyst, instead of the organic peroxide, a suitable metallic salt of sulfinic acid with a polymerizable carboxylic acid as the accelerator in the liquid phase. The polymerizable carboxylic acid acts to deactivate the metallic salt of sulfinic acid so as to release the active sulfinic acid which acts as a free radical polymerizable catalyst in the polymerization of the polymerizable solvent and adduct under the conditions existing in the oral environment. The suitable metallic salts of sulfinic acid include, for example, the alkali-metal salts of toluene sulfinic acid, e.g., lithium, potassium, or sodium p-toluene sulfinate, the alkali metal salts of benzene sulfinic acid e.g. lithium, potassium, or sodium benzenesulfinate, etc. Again, while such materials are exemplary, any sulfinic acid liberating metallic salt can be advantageously utilized, such catalysts being well-known in the polymerization of dental materials.

The organic carboxylic acid which is polymerizable under the conditions existing in the oral environment can comprise any dentally acceptable acid, preferably the polymerizable carboxylic acid is methacrylic acid or acrylic acid since such acids are very compatible with the polymerizable solvents of the liquid system and, accordingly provide compatible co-polymerizable products. In accordance with the present invention, such sulfinate yielding catalyst is generally employed in the solid or powder phase of the composite restorative material in an amount of from about 0.6 to about 0.9, preferably 0.75 to about 0.80% by weight, based upon the weight of the powder. It can be seen from a comparison of such amounts of the sulfinic acid yielding catalyst to the organic peroxide catalyst as previously discussed, that slightly greater amounts of the sulfinic acid yielding catalyst are necessary. This is due to the fact that such catalyst is not as active in the system of the present invention as the organic peroxide catalyst and, therefore, to provide a composite restorative material, capable of being cured within the time limitations previously discussed, it is necessary to employ greater amounts of this catalyst material.

The polymerizable carboxylic acid is generally employed in an amount of from about 2.0 to about 10.0% by weight, preferably from about 3.0 to about 7.0% by weight based upon the liquid system. Accordingly, when such polymerizable carboxylic acid is utilized, the polymerizable solvent is generally present in an amount of from 90.0 to about 98.0 preferably 93.0 to about 97.0% by weight based upon the total liquid system. It is pointed out with respect to the use of the sulfinic acid yielding catalyst-carboxylic acid system, that the amount of the polymerizable carboxylic acid within the liquid phase of the composite restorative material is quite variable, since only that amount necessary to liberate the sulfinic acid and accordingly catalyze the polymerization reaction need be employed. However, excess amounts of acid, e.g., methacrylic acid, do not adversely affect the system since such material very readily polymerizes within the oral environment to produce a copolymer product with the polymerizable monomer and polymerized adduct.

Similarly, while the above composite restorative materials have been described primarily with respect to the employment of a solid phase consisting of a filler, the adduct of the present invention and the peroxide catalyst, it should be clear that the adduct, including the minor amount of catalyst, can comprise the whole of the solid or powder phase. In this regard, it is not absolutely necessary that a filler material be present since the adducts of the present invention are solid, such materials alone can be employed as the solid or particulate phase of a composite material. Since such material would generally comprise all synthetic resin, it could not properly be called a composite restorative material but would be adequately suitable for use in the restoration of teeth. It is preferred, however, for maximum strength and durability, to include an amount of filler as previously described so as to provide an actual composite restorative material comprising a composite of dental filler and a polymerized plastic phase.

In addition, other optional components can be advantageously employed in the composite restorative materials as described above. Thus, for example, in order to ensure cold-curing polymerization at the temperature existing in the oral environment, minor traces of accelerating components such as copper acetyl acetonate and tetrabutyl ammonium chloride, can be advantageously incorporated into the composite material. Additionally, the methacrylate precursor i.e., 2,2'-propane bis[3-(4-phenoxy)-1,2-hydroxy propane-1-methacrylate] can be advantageously employed in the liquid phase of the composite material. By employing the methacrylate precursor of the adduct of the present invention in the liquid phase of the composite material, it is possible to modify the viscosity of the liquid phase while providing a material which will cross-link with the adduct employed in the solid phase of the restorative composition. By providing such a means for cross-linking, a composite restorative material of even greater strength can be produced. Such methacrylate precursor is generally employed in an amount of from about 2.0% to about 20.0% by weight, based upon the weight of the liquid system.

Similarly, while the above discussion has been generally directed toward the formulation of a composite dental restorative material which consists of a powder or solid phase and a liquid or solvent phase, it should be quite clear that a paste, i.e., a mixture of powder and liquid, can be advantageously formulated. Such a paste would contain the filler, solid adduct of the present invention, polymerizable solvent and amine accelerator for the polymerization catalyst. To such a composition would be added the peroxide or similar catalyst and additional filler if required. The addition of catalyst would be made to the paste just prior to mixing and preparing the restorative composition for use by the dentist. By utilizing a paste containing the filler, adduct, polymerizable solvent and amine accelerator, a stable system is provided which becomes active and polymerizable in the environment of the oral cavity by the addition of the polymerization catalyst. In such a paste, the filler, i.e., the ceramic and/or glass filler, would generally comprise from about 40 to 80% of the paste composition, preferably 60 to 70%; the adduct would generally comprise from about 5 to about 40% preferably from about 5 to about 10% of the paste composition; and the polymerizable solvent would comprise from about 10 to about 40% by weight, preferably from about 20 to about 25% by weight of the paste composition. The above ranges, of course, are exclusive of the amine accelerator, which, as indicated previously, comprises a very minor proportion of a dental restorative composition. In formulating such a paste, the amine accelerator is generally employed in an amount of from about 0.1% to about 0.4% by weight, preferably from about 0.1% to about 0.2% by weight based upon the total paste composition.

The peroxide catalyst is generally added in an amount of from about 0.05% to about 0.3% by weight, preferably from about 0.1% to about 0.2% by weight, based upon the total composition. The peroxide may be added to the paste composition as described above in conjunction with additional filler, the additional filler bringing the total filler content within that range specified above. In addition, other additive materials including the methacrylate precursor can be included within the paste composition, the amount of such materials being as set forth previously.

While the above description has been presented primarily with respect to the formulation of a composite restorative material utilizing the adduct of 2,2'-propane bis[3-(4-phenoxy)-1,2-hydroxy propane-1-methacrylate] and a mono- or di-isocyanate, it should be clear that other dental products, including, for example, dental cements, dental lacquers, dental cavity liners, etc., can be advantageously formulated. Such compositions will be described hereinafter as follows:

DENTAL CEMENTS

In a similar manner as described above, with respect to the utilization of the adducts of the present invention in a composite restorative material, such adducts of 2,2'-propane bis[3-(4-phenoxy)-1,2-hydroxy propane-1-methacrylate] and a mono or diisocyanate can be advantageously utilized in the solid or powder phase of a dental cement.

A dental cement differs from the composite restorative material previously discussed in that the cement is formulated so as to set or cure over a longer period of time than the restorative material. This is due to the fact that in the use of the dental cement, the dentist must do more manipulative steps so that a longer setting time allows the dentist more time to complete the cementing operation. Thus for example, when a dental cement is employed to cement an orthodontic device to the teeth, a fairly slow setting time is required so that the manipulative steps required can be carried out prior to the final setting or curing of the dental composition.

Similarly, a dental cement differs from the composite restorative material previously discussed in that a smaller particle size distribution of the ceramic and/or glass filler is utilized. In this regard, the average particle size of the ceramic and/or glass filler employed in a dental cement is usually less than 10 microns since such smaller particle size is necessary to achieve the low film thickness associated with the employment of dental cements. This, of course, is in contradistinction to the composite restorative material which does not require the smaller particle size filler since small film thicknesses are not encountered. In formulating a dental cement, the decrease in the average particle size of the ceramic and/or glass filler is usually accompanied by the reduction in the quantity of the filler in the cement material.

In preparing a dental cement in accordance with the present invention, the adduct, i.e. solid adduct of the present invention, is incorporated in the solid phase, again consisting of the filler, i.e., ceramic and/or glass filler, and solid catalyst. Thus, for example, the solid or powder phase of the dental cement may comprise essentially, the same materials as previously set forth with respect to the powder or solid phase of the composite restorative material. In the preparation of the cement, however, it is preferred that the filler content be within the lower portion of the range, that is, the filler preferably comprises from about 45 to about 65% of the solid or powder phase. The remainder of the solid or powder phase comprises the solid adduct of the present invention, such material comprising from about 35 to about 55% by weight of the solid. Again, a solid catalyst, preferably a peroxide, e.g., benzoyl peroxide, can comprise from about 0.15 to about 0.25% by weight of the total solid composition.

Again, the liquid phase of the dental cement can generally comprise 100% polymerizable organic solvent, such solvent containing a minor amount, e.g., from about 0.1 to about 0.3% of a tertiary amine accelerator. Again, any of the materials previously described with respect to the composite restorative material can be utilized in conjunction with the above described dental cement.

It is also pointed out that the additional materials previously described can also be included within the dental cement composition. In this regard it has been found advantageous to include within the liquid phase the monomeric methacrylate precursor capable of cross-linking with the polymerizable organic solvents and solid adduct of the present invention. In this connection the liquid phase of the dental cement can contain up to about 50% by weight of the methacrylate precursor.

When the various components of the dental cement are employed in the amounts specified above, the cement is capable of curing in the oral environment in about 5 to 6 minutes. This allows the dentist sufficient time to make all manipulative steps before the final curing or setting of the cement.

In preparing the dental cement, the powder as described above is mixed with the liquid in a ratio ranging from about 1:1 to about 3:1 by weight, it being preferable that the powder/liquid ratio be from about 1:1 to about 2:1.

Although the above described dental cement has been illustrated with respect to the employment of a peroxide catalyst in the solid or powder phase and a tertiary amine accelerator in the liquid phase, it is of course obvious that other polymerization systems can be utilized. Thus, as was the case with respect to the composite restorative materials of the present invention, a catalyst system based upon a metallic salt of sulfinic acid and a polymerizable carboxylic acid can be advantageously utilized. In such a case, the solid or powder phase of the dental cement will generally contain from about 0.4 to about 0.6% of the metallic salt of sulfinic acid with the liquid phase containing from about 20% to about 10.0% of the polymerizable carboxylic acid. Here again, the amount of polymerizable carboxylic acid in the liquid phase of the dental cement is very variable since only that amount necessary to liberate the sulfinic acid need be employed. Thus, excess polymerizable carboxylic acid merely polymerizes with the polymerizable solvent and adduct to produce a copolymer-cross-linked system.

Again, it is pointed out that traces of accelerating compounds such as copper acetyl acetonate and tetra-butyl ammonium chloride can be incorporated in the dental cement to ensure cold curing polymerization under the temperature conditions existing in the oral cavity.

In either the composite restorative materials previously described or the dental cements described above, it is possible to include a liquid adduct, e.g. methyl isocyanate adduct of 2,2'-propane bis[3,4-(4-phenoxy)-1,2-hydroxy propane-1-methacrylate] in the liquid phase of the composition. The use of such an adduct in an amount of up to about 50% by weight based upon the weight of the liquid phase is sometimes advantageous to increase the viscosity of the liquid phase and total composition and provide a means by which cross-linking of the adducts can take place. Thus, by employing a solid adduct in the solid phase of the composite restorative material or dental cement and a liquid adduct in the liquid phase, it is possible to obtain polymerization and cross-linking of the adducts during curing and setting of the dental compositions. This provides for a very strong product.

In certain applications it is generally preferred to provide for a dental cement which is transparent and which does not contain any ceramic and/or glass filler. Thus, for example, the use of such a dental cement would be advantageous in cementing transparent orthodontic brackets to the teeth. The use of a filler, e.g., ceramic or glass filler in such a cement composition, would be disadvantageous due to the opacity created by the filler particles. Accordingly, in such cases, the entire solid portion of the dental composition, i.e., dental cement, can comprise the solid adduct of the present invention.

Such composition containing no filler can, in accordance with the present invention, be advantageously photo-polymerized by use of long wave-length ultra violet light, that is, ultra violet light within the range of about 3550 A. to about 3720 A., preferably approximiately 3660 A. Such photo-polymerization by means of long wave ultra violet light is capable of producing the required polymerization and curing of the polymerizable solvent and solid adduct yet has been found to be completely harmless to the tissues within the oral environment.

In preparing such a composition for photo-polymerization, the solid adduct of the present invention is generally combined with the polymerizable solvent in the form of a paste, the solid or powder phase consisting of an ultra violet light sensitizer.

Thus, for example, the liquid phase of such composition may contain from about 25 to about 35% by weight of the solid adduct of the present invention, from about 25 to about 35% by weight of the polymerizable solvent as previously defined and from about 35 to about 45% by weight of the methacrylate precursor, i.e. 2,2′-propane bis[3-(4-phenoxy)-1,2-hydroxy propane-1-methacrylate]. It is necessary to employ the methacrylate precursor in the liquid phase of such a composition since it is needed to solubilize the solid adduct in the polymerizable solvent, since the solid adduct is not very soluble in the polymerizable solvent.

While the above description has been made with respect to the presence of no filler within the composition, it is of course obvious that some amount of filler can be utilized. Again, however, it is preferred when producing a dental cement, particularly adapted for the use in cementing transparent orthodontic brackets, that the filler content be minimum or zero, since opacity of the cement composition containing the filler is increased.

To such a liquid composition comprising the solid adduct methacrylate precursor and polymerizable solvent, is added from about 1% to about 5% by weight of a UV sensitizer, any of those conventionally employed in the art being applicable. Thus, for example, representative classes of UV sensitizers include the benzoin alkyl ethers, e.g., benzoin methyl ether, benzoin ethyl ether, benzoin butyl ether, benzoin hexyl ether, benzoin octyl ether, etc.; the various substituted benzophenones, e.g., 4,4′-dimethyl-benzophenone, 4-methacryloxybenzophenone, etc., as well as various other well-known ultra violet light sensitizers. Again, the nature of the sensitizer does not form a basis of the present invention and any well-known and conventionally employed UV sensitizers can be advantageously utilized.

Thus, this form of dental cement containing the adduct of 2,2′-propane bis[3-(4-phenoxy)-1,2-hydroxy propane-1-methacrylate] and a mono- or diisocyanate, differs from those previously described in that it employs photopolymerization, i.e., polymerization accelerated and promoted by means of longwave ultra violet light. Accordingly, a UV sensitizer is employed in lieu of the eccelerator-catalyst systems previously described.

DENTAL CAVITY LINERS

A dental cavity liner generally comprises a polymerizable system which is capable of producing a continuous film or lining in a cavity in a tooth so as to provide a base upon which a restorative material or filling can be applied. To provide such a continuous film it is generally required that the cavity liner comprise a polymerizable system absent any ceramic and/or glass filler. Accordingly, the dental cavity liners suitably produced in accordance with the present invention are similar to the aforedescribed composite restorative materials except that the solid or powder phase consists essentially of the solid adduct of 2,2′-propane bis[3-(4-phenoxy)-1,2-hydroxy propane-1-methacrylate] and the mono- or diisocyanate and such solid or powder phase contains no filler.

In accordance with the other dental compositions described above, the solid phase of the dental cavity liner generally contains a minor amount of a solid catalyst, e.g., organic peroxide. Although such catalysts can be employed in the amounts previously described with respect to the composite restorative material and dental cement, it is pointed out that in connection with the production of a cavity liner, the solid phase can contain more of the solid catalyst, e.g., organic peroxide, since rapid setting or curing of the system is desired. In this regard it is pointed out that in utilizing the dental cavity liner, the cavity is prepared and the dental composition merely painted on and set as fast as possible so as to provide a base upon which the dental restorative material can be set. Accordingly, the powder portion of the dental cavity liner can tolerate up to about 1.0% by weight of the organic peroxide catalyst, such amount of catalyst tending to quickly polymerize and set the dental composition.

Again, as was the case with the previously described dental compositions, the liquid portion of the dental cavity liner can consist essentially of the liquid polymerizable solvent containing the accelerator for the catalyst system. Again, the accelerator can be employed in those amounts previously specified although, due to the desire for rapid polymerization and setting, the liquid system can tolerate up to about 1.0% by weight of the accelerator.

Similarly, although the liquid system of the dental cavity liner can consist essentially of the liquid polymerizable solvent, it is of course possible to include other materials, e.g., the methacrylate precursor and/or liquid adducts within the liquid phase. Each of these additional components can be employed as a replacement for up to about 75% by weight of the liquid system, that is, can comprise up to 75% by weight of the liquid. When employed, such additional materials, e.g. methacrylate precursor or liquid adducts are employed in an amount of at least 20% by weight, based upon the weight of the liquid system. It pointed out that with respect to the utilization of each of these optional components in the liquid phase, that such components tend to increase the viscosity of the liquid and provide an environment producing cross-linking.

In preparing the dental cavity liner, the solid phase is generally mixed with the liquid phase in a ratio of solid to liquid of from about 1:2 to about 3:1, preferably in a ratio of about 1:1 by weight.

In lieu of the peroxide-tertiary amine catalyst-accelerator system described above in connection with a suitable dental cavity liner in accordance with the present invention, it is of course obvious that other suitable free radical polymerization systems can be utilized. In this regard again, a system comprising a metallic salt of sulfinic acid and a polymerizable carboxylic acid can be advantageously utilized. Thus, while these catalysts and accelerator materials can be employed in those amounts previously described with respect to the composite restorative material and dental cement, due to the desire for rapid polymerization and setting of the dental cavity liner, the solid system can tolerate up to about 5.0% by weight of the metallic salt of sulfinic acid while the liquid phase can tolerate up to about 20.0% by weight of the polymerizable carboxylic acid. Again, it is pointed out that the excess polymerizable carboxylic acid merely adds to the polymerization system and such material copolymerizes and cross-links with the liquid and solid adduct of the present invention and polymerizable solvent employed as the principal component of the liquid phase of the dental composition.

Similarly, as was the case with respect to the previously described composite restorative materials and dental cements, such dental cavity liner can contain minor amounts of accelerating compounds.

DENTAL LACQUER

A dental lacquer is a material which is quite similar to the transparent dental cement previously described, in that it is desirable that such material be transparent and provide only a very thin film of polymerizable material. Accordingly, due to the transparent characteristics of such dental lacquer, it is preferred that the same contain no ceramic and/or glass filler. Similarly, it is preferred that such dental lacquer contain no solid material at all so that the liquid phase does not contain any of the solid adduct.

Preferably the liquid phase of a dental lacquer in accordance with the present invention comprises a polymerizable solvent as previously described and in a liquid adduct as in accordance with the present invention.

The liquid adduct generally comprises from about 40% to about 80% by weight of the liquid system, while the polymerizable solvent comprises from about 20% to about 60% by weight.

To such liquid system is added from about 1% to about 5% by weight of a powder consisting of an ultra violet light sensitizer. Again, any of the previously described conventional sensitizers can be employed in accordance with the present invention. Preferably, the sensitizer is added to the liquid system in an amount of from about 2% to about 3% by weight based upon the weight of the total composition.

Again, such a dental lacquer composition can be photo-polymerized by means of long wave-length ultra violet light, preferably ultra violet light within the range of 3550 A. to 3720 A.

The present invention will now be described by reference to the following specific examples:

Example I

The following example illustrates the preparation of an adduct of 2,2' - propane bis[3-(4-phenoxy) - 1,2 - hydroxy propane-1-methacrylate] and toluene diisocyanate.

The adduct of 2,4 tolylene diisocyanate and 2,2'-propane bis[3 - (4 - phenoxy) - 1,2 - hydroxy propane-1-methacrylate] was produced by reacting 34.5 grams (0.067 moles) of the latter, dissolved in 25 ml. dry diethyl ether, with 11.5 grams (0.066 moles) of the former, dissolved in a further 10 ml. of dry diethyl ether. The 2,4 toluene diisocyanate, dissolved in diethyl ether was added drop-wise to the resin solution over a period of one half hour under reflux conditions. Over the course of the addition and subsequent reaction there was a slight sign of an exothermic reaction but only sufficient to produce a mild reflux which soon subsided. Stirring and reaction continued for approximately two hours. The addition of 25 ml. of petroleum ether resulted in the separation of a pale yellow oil which foamed under high vacuum to an amorphous solid. The yield was 37.25 grams (80.2%) of an amorphous solid having a melting point of 85° C. The product i.e. the adduct of 2,2' - propane bis[3 - (4 - phenoxy) - 1,2 - hydroxy propane - 1 - methacrylate] and toluene diisocyanate was found to polymerize readily in ethereal solution by the addition of a free radical catalyst-accelerator system.

Example II

Preparation of the adduct of methyl isocyanate and 2,2' - propane bis[3 - (4 - phenoxy) - 1,2 - hydroxy propane-1-methacrylate].

In preparing the above adduct 30 grams (0.058 moles) of the resin dissolved with stirring in 25 ml. anhydrous diethyl ether and a solution of 6.7 grams (0.116 moles) methyl isocyanate dissolved in a further 10 ml. diethyl ether were mixed by adding methyl isocyanate to the methacrylate monomer drop-wise with stirring.

The reaction mixture was stirred for an additional 2 hours after the drop-wise of methyl isocyanate and allowed to stand overnight. 50 ml. of petroleum ether were then added with stirring to effect phase separation. Upon completion of solvent removal, a product was formed which foamed in vacuo while taking the form of an extremely viscous resin.

Again, such resin produced as above was found to polymerize readily in a free radical catalyst-accelerator system.

Example III

Preparation of the adduct of butyl isocyanate and 2,2'-propane bis[3 - (4 - phenoxy) - 1,2 - hydroxy propane-1-methacrylate].

40.7 grams (0.079 moles) of the resin dissolved with stirring in 25 ml. anhydrous diethyl ether was mixed with a solution of 15.7 grams (0.15 moles) butyl isocyanate dissolved in a further 10 ml. diethyl ether, the butyl isocyanate being added to the methacrylate monomer drop-wise with stirring. Stirring was continued further for two hours and the reaction product was allowed to stand overnight. Phase separation was effected through the addition of 50 ml. petroleum ether with stirring. Upon completion of solvent evaporation an extremely viscous sweet-smelling semi-solid resin was produced. Again such resin was found to polymerize readily in a free radical catalyst-accelerator system.

Example IV

Preparation of the adduct of dianisidine diisocyanate and 2,2'-propane bis [3-(4-phenoxy) - 1,2 - hydroxy propane-1-methacrylate].

36.4 grams of the resin (0.071 mole) dissolved with stirring in 25 ml. anhydrous diethyl ether and 22.8 grams 0.07 mole) dianisidine diisocyanate were mixed, the diisocyanate being added gradually into the reaction mixture, the same being washed down with 10 ml. additional ether. The reaction mixture was stirred further for 3 hours and the reaction product allowed to stand over-night. When filtered off, a solid resinous product capable of being readily polymerized was produced.

Example V

Preparation of the adduct of α-naphthyl isocyanate and 2,2'-propane bis [3-(4-phenoxy)-1,2-hydroxy propane-1-methacrylate].

35.8 grams (0.07 mole) of the resin dissolved with stirring in 25 ml. anhydrous diethyl ether was mixed with 23.6 grams (0.14 mole) α-naphthyl isocyanate, by drop-wise addition of the latter in 15 ml. diethyl ether to the former with stirring over a period of one half hour. While no visible signs of an exothermic reaction occurred, soon after addition complete reaction mixture turned very cloudy followed by precipitation of a very pale pink amorphous solid. Stirring was continued for three hours and the reaction product was allowed to stand over-night. No further precipitation occurred, the reaction product being filtered, washed with diethyl ether and dried to yield a high-melting by-product precipitate in the amount of 1.55 gm., the precipitate melting at 280° C.

Addition of petroleum ether to the filtrate yielded pale pink oil which foamed under high vacuum to yield an amorphous solid, having a melting point of 58° C. Such amorphous solid polymerized readily in ethereal solution by the addition of a free radical polymerization catalyst-accelerator system.

Example VI

A composite restorative material was produced by preparing a powder phase containing a ceramic and glass filler, benzoyl peroxide catalyst, and an adduct of hexamethylene diisocyanate and 2,2' - propane bis[3 - (4-phenoxy)-1,2-hydroxy propane-1-methacrylate]. The filler composition employed in the composite restorative material was one having maximum particle size of 25 microns, the particles ranging from fines to particles of this maximum value.

The liquid composition employed in the composite restorative material consisted essentially of methylmethacrylate as the polymerizable solvent, the liquid system containing dimethyl p-toluidine as an accelerator and activator for the benzoylperoxide catalyst. By employing the benzoylperoxide catalyst in the solid phase, a stable composition was prepared and no premature polymerization occurred.

The dental composite restorative material has the following composition:

Powder: Percent
  Ceramic filler (lithium aluminum silicate powder) _____ 39.98
  Glass filler _____ 39.98
  Hexamethylene diisocyanate adduct _____ 20.01
  Benzoyl peroxide _____ 0.03
Liquid:
  Methyl methacrylate (inhibited) _____ 99.6
  Di methyl para toluidine _____ 0.4

Such a composition when employed as a composite restorative material is prepared by mixing the powder or solid phase with the liquid phase in a ratio of approximately 4:1, such a composition having an onset of curing or setting within approximately one to one and one-half minutes with the final curing or setting occurring within about five minutes. Accordingly, such a system is very suitable for a composite restorative material that it allows the dentist sufficient time to manipulate the same within a cavity while presenting a minimum of inconvenience to the patient in that it cures within the oral environment in a fairly short period of time.

Example VII

A similar composite restorative material as prepared in accordance with Example VI was prepared, except that the catalyst-accelerator system comprising a metallic salt of sulfinic acid and a polymerizable carboxylic acid was utilized. Thus, in accordance with this composite restorative material the lithium p-toluene sulfinate was incorporated in the powder or solid portion in lieu of the benzoyl peroxide of Example VI, while methacrylic acid was incorporated in the liquid portion in lieu of the tertiary amine accelerator.

Such composite restorative material had the following composition:

Powder: Percent
  Ceramic filler (lithium aluminum silicate powder) _____ 35.67
  Glass filler _____ 35.67
  Hexamethylene diisocyanate adduct _____ 27.87
  Lithium para toluene sulfinate _____ 0.79
Liquid:
  Methyl methacrylate (inhibited) _____ 95.0
  Methacrylic acid _____ 5.0

Again, such a composition utilized by mixing the powder phase with the liquid phase in a ratio of about 4:1, is exceptionally satisfactory as a composite restorative material in that the same begins to polymerize or set in about one to one and one half minutes with polymerization and setting complete in about five minutes. Again, this is a particularly advantageous feature of a composite restorative material. In view of the presence of the adduct of 2,2'-propane bis[3 - (4 - phenoxy) - 1,2 - hydroxy propane-1-methacrylate], and the mono- or diisocyanate, such composite restorative material has exceptional strength and solubility characteristics.

Example VIII

The composite restorative material of Example VI is again produced except that the adduct, i.e., adduct of 2,2$\beta$-propane bis[3-(4-phenoxy)-1,2-hydroxy propane-1-methacrylate] and hexamethylene diisocyanate, is replaced with a substantially equivalent amount of the adducts of 2,2' - propane bis[3-(4-phenoxy)-1,2-hydroxypropane-1-methacrylate] and the following mono and diisocyanates:

(a) n-octyl isocyanate
(b) dodecyl isocyanate
(c) phenyl isocyanate
(d) $\alpha$-naphthyl isocyanate
(e) octamethylene diisocyanate
(f) toluene-2,4-diisocyanate
(g) naphthalene-1,4-diisocyanate
(h) dianisidine diisocyanate when employing such adducts in the composite restorative material as described in Example VI, a composite material of substantially equivalent strength characteristics is produced.

Example IX

A composite restorative material in the form of a paste was prepared utilizing the same materials as in Example VI. In formulating the paste, however, the paste contained the ceramic and glass filler, the adduct, polymerizable solvent and accelerator for the polymerization catalyst. Additionally the paste contained the precursor methacrylate as an aid in solubilizing or dissolving the adduct in the polymerizable solvent. Such paste had the following composition:

Paste: Percent
  Ceramic filler (lithium aluminum silicate powder) _____ 34.5
  Glass filler _____ 34.5
  Hexamethylene diisocyanate adduct _____ 7.13
  Commercial Epoxylite CF 8760 _____ 14.25
  Methyl methacrylate (inhibited) 100 p.p.m. MEHQ _____ 9.5
  Di methyl para toluidine _____ 0.12

To such a paste is aded approximately 1% benzoyl peroxide together with an additional amount of ceramic filler, approximately 1/10 of the amount present in the paste. The addition of the benzoyl peroxide catalyst to the paste composition containing the tertiary amine accelerator immediately provides for a system which readily polymerizes in the oral environment. Here again, such a system is an exceptional restorative material in that onset of polymerization or setting begins approximately one and one-half minutes after mixing of the paste with the benzoyl peroxide catalyst, while complete setting or curing of the resin system occurs in approximately five minutes. The strength characteristics of the composite material are again exceptional due to the presence of the adduct.

Example X

Employing the same components as in Example VI a dental cement was produced by reducing the quantity and average particle size of the ceramic and glass filler. The particle size being reduced to less than 10 microns so as to achieve a composition which can produce thin film thicknesses. Additionally the catalyst concentration is reduced somewhat so as to achieve longer setting times since more manipulative time is necessary in order to utilize the dental cement. Accordingly, a dental cement produced as above had the following composition:

Powder: Percent
  Ceramic filler (lithium aluminum silicate powder) _____ 25.0
  Glass filler _____ 25.0
  Hexamethylene diisocyanate _____ 49.8
  Benzoyl peroxide _____ 0.2
Liquid:
  Methyl Methacrylate (inhibited) 100 p.p.m. MEHQ _____ 60.0
  Commercial Epoxylite CF 8760 _____ 39.8
  Di methyl para toluidine _____ 0.2

To prepare the dental cement the above powder composition is mixed with the liquid composition in a ratio of about 2:1. Such a composition has excellent strength characteristics and polymerization characteristic for utilization as a dental cement.

Example XI

A composition as produced in Example X was again produced except that the catalyst-accelerator system was replaced with one comprising a metallic salt of sulfinic acid and a polymerizable carboxylic acid. Such a composition was as follows:

Powder: Percent
    Ceramic filler (lithium aluminum silicate powder) ............................. 25.0
    Glass filler ................................. 25.0
    Hexamethylene diisocyanate adduct ........ 49.5
    Lithium para toluene sulfinate .............. 0.5
Liquid:
    Methyl methacrylate (inhibited) 100 p.p.m. MEHQ ..................................... 55.0
    Methacrylic acid 100 p.p.m. MEHQ ........ 5.0
    Methyl isocyanate adduct .................. 40.0

In the above composition, the methyl isocyanate adduct of 2,2'-propane bis[3-(4-phenoxy)-1,2-hydroxy propane-1-methacrylate] in the liquid phase increases the viscosity of the dental cement while providing cross-linking with the hexamethylene diisocyanate adduct in the solid phase. This provides for an even stronger dental composition.

Example XII

A dental cement was prepared which was especially suitable for use in cementing transparent orthodontic brackets to the teeth. Such a cement was prepared without the use of any filler since the addition of filler would have lessened the transparency of the cement. Due to the fact that the cement is transparent the same is capable of being photopolymerized by means of long wave length ultraviolet light, i.e., ultraviolet light of approximately 3,660 A. In preparing the dental cement the powder and liquid phases were prepared as follows:

Liquid: Percent
    Powder: Benzoin methyl ether (used as 2% addition to liquid).
    Hexamethylene diisocyanate adduct .......... 30
    Commercial Epoxylite CF 8760 .............. 40
    Methyl methacrylate (inhibited) 100 p.p.m. MEHQ ..................................... 30

It can be seen from the above formulation that the liquid phase contained the solid adduct of the present invention, hexamethylene diisocyanate adduct, the polymerizable solvent, i.e., methyl methacrylate, and the methacrylate precursor employed to solubilize the adduct in the solvent. To such a liquid phase the benzoin methyl ether, i.e., the ultraviolet sensitizer is added, the polymerization being initiated through the application of ultraviolet light.

Again, such a composition as described above is particularly useful in the cementing of transparent orthodontic brackets since the cement, absent any ceramic or glass filler, is substantially transparent.

Example XIII

Using similar components as in Example VI a polymerizable cavity liner was produced. Thus, by removal of the filler content of the solid phase of the composition described in Example VI a polymerizable cavity liner can be produced from the following components:

Powder: Percent
    Hexamethylene diisocyanate adduct ........ 99.25
    Benzoyl peroxide ......................... 0.75
Liquid:
    Methyl methacrylate (inhibited) 100 p.p.m. MEHQ ..................................... 39.60
    Di methyl para toluidine .................. 0.40
    Commercial Epoxylite CF 8760 ............. 60.00

The dental cavity liner is produced by mixing the powder and liquid compositions as described above in a ratio of about 1:1, the onset of polymerization beginning almost immediately. In this regard it is noted that with respect to a cavity liner, it is advantageous that polymerization be begun as soon as possible since it is only necessary to paint a very thin film of the same in the tooth cavity.

By utilizing the composition of the present invention, it is possible to provide a continuous film polymerizable cavity liner having great advantages over conventional evaporation dependent type cavity liners generally utilized.

Example XIV

By removal of the filler content from the composition described in Example VIII a similar cavity liner is produced utilizing a polymerizable system comprising the metallic salt of sulfinic acid and a polymerizable carboxylic acid.

Such a dental cavity liner comprises the following components:

Powder: Percent
    Hexamethylene diisocyanate adduct .......... 97.5
    Lithium para toluene sulfinate .............. 2.5
Liquid:
    Methyl methacrylate (inhibited) 100 p.p.m. MEHQ ..................................... 55.0
    Methyl isocyanate adduct .................. 40.0
    Methacrylic acid 100 p.p.m. MEHQ ........ 5.0

In preparing the dental cavity liner the powder and liquid components are mixed in a ratio of approximately 1:1 with the onset of polymerization occurring almost immediately. It is noted that in the above composition the liquid adduct is employed to increase the viscosity of the liquid system.

Example XV

By the entire removal of the filler content, including the solid adduct content of a composition as illustrated in Example VI a dental lacquer can be prepared which is suitable for photopolymerization. A specific example of this type of dental lacquer is as follows:

Liquid: Percent
    Powder: Benzoin methyl ether (used as 2% addition to liquid).
    Methyl isocyanate adduct .................. 75.0
    Methyl methacrylate (inhibited) 100 p.p.m. MEHQ ..................................... 25.0

It is noted that the liquid phase of this composition contains the liquid adduct of methyl isocyanate and 2,2'-propane bis[3-(4-phenoxy)-1,2-hydroxy propane-1-methacrylate] which can copolymerize with the polymerizable solvent, i.e., methyl methacrylate.

It should be clear from the above specific examples that the present invention is not predicated upon the use of any particular filler or polymerizable solvent system, the essence of the present invention residing in the production of improved dental compositions, e.g., composite restorative materials, dental cements, dental cavity liners, dental lacquers, through the utilization of a solid and/or liquid adduct of 2,2'-propane bis[3-(4-phenoxy)-1,2-hydroxy propane-1-methacrylate] and a mono or diisocyanate. It should also be clear that in addition to the particular components that have been illustrated in the above specific examples, the dental compositions can contain other conventional components generally employed for dental applications. Thus, for example, the addition of fluorides, bacteriostatic agents, and antibiotics in minor amounts is well within the scope of the present invention, the addition of such materials being made in a conventional manner so as to provide some antibacterial or anticariogenic action to the dental compositions.

What is claimed is:

1. In a dental composition prepared by mixing and polymerizing a composition consisting essentially of (A)

a particulate filler and solid polymerization catalyst comprising a solid phase and (B) a polymerizable solvent selected from esters of acrylic acid and methacrylic acid and polymerization accelerator comprising a liquid phase, the improvement which comprises including within said solid phase a solid adduct of 2,2'-propane bis(3-(4-phenoxy)-1,2-hydroxy propane-1-methacrylate) and a mono- or diisocyanate.

2. The improved dental composition of claim 1 wherein said mono- or diisocyanate comprises an alkylene or aromatic diisocyanate.

3. The improved dental composition of claim 2 wherein said mono- or diisocyanate comprises hexamethylene diisocyanate.

4. A composite dental restorative material prepared by mixing and polymerizing a composition consisting essentially of:
  (A) a solid phase comprising
    (1) from about 45% to about 85% by weight of a ceramic or glass filler or mixture thereof; and
    (2) from about 15% to about 55% by weight of a solid adduct of 2,2'-propane bis(3-(4-phenoxy)-1,2-hydroxy propane - 1 - methacrylate) and a mono- or diisocyanate; and
  (B) a liquid phase comprising a dentally acceptable polymerizable solvent selected from esters of acrylic acid and methacrylic acid;
  said solid phase containing a free radical polymerization catalyst, and said liquid phase containing an accelerator system, the weight ratio of solid and liquid being from about 4:1 to 6:1.

5. The composite dental restorative material of claim 4 wherein said mono- or diisocyanate comprises an alkylene or aromatic diisocyanate.

6. The composite dental restorative material of claim 5 wherein said mono- or diisocyanate comprises hexamethylene diisocyanate.

7. The composite dental restorative material of claim 4 wherein said free radical polymerization catalyst is an organic peroxide and said accelerator is a teritary amine, said peroxide and amine being present in amounts of about 0.025 to 0.5 and about 0.3 to 0.5% by weight, respectively.

8. The composite dental restorative material of claim 4 wherein said free radical polymerization catalyst is a metallic salt of sulfinic acid and said accelerator is a polymerizable carboxylic acid, said metallic salt of sulfinic acid and polymerizable carboxylic acid being present in amounts of about 0.6 to 1.5 and about 2.0 to 10.0% by weight, respectively.

9. A composite restorative material prepared by mixing and polymerizing a paste consisting essentially of:
  (A) from about 40 to about 80% by weight of a ceramic or glass filler or mixture thereof;
  (B) from about 5 to about 40% by weight of a solid adduct of 2,2'-propane bis (3-(4-phenoxy)-1,2-hydroxy propane-1-methacrylate) and a mono- or diisocyanate;
  (C) from about 10 to 40% by weight of a dentally acceptable polymerizable solvent selected from esters of acrylic acid and methacrylic acid; and
  (D) a minor amount of a polymerization accelerator and as a separate phase, a minor amount of a free radical polymerization catalyst.

10. The composite dental restorative material of claim 9 wherein said mono- or diisocyanate comprises an alkylene or aromatic diisocyanate.

11. The composite dental restorative material of claim 10 wherein said mono- or diisocyanate comprises hexamethylene diisocyanate.

12. A dental cement prepared by mixing and polymerizing a composition consisting essentially of:
  (A) a solid phase comprising
    (1) about 45 to 65% by weight of a ceramic or glass filler or mixture thereof;
    (2) about 35 to about 55% by weight of a solid adduct of 2,2'-propane bis (3-(4-phenoxy)-1,2-hydroxy propane-1-methacrylate) and a mono- or diisocyanate; and
  (B) a liquid phase comprising a dentally acceptable polymerizable solvent selected from esters of acrylic acid and methacrylic acid;
  said solid phase containing a free radical polymerization catalyst, and said liquid phase containing an accelerator system, the weight ratio of solid to liquid being from about 1:1 to about 3:1.

13. The dental cement of claim 12 wherein said mono- or diisocyanate comprises an alkylene or aromatic diisocyanate.

14. The dental cement of claim 13 wherein said mono- or diisocyanate comprises hexamethylene diisocyanate.

15. The dental cement of claim 12 wherein said free radical polymerization catalyst is an organic peroxide and said accelerator is a tertiary amine, said peroxide and amine being present in amounts of about 0.15 to 0.25 and about 0.1 to 0.3% by weight respectively.

16. The dental cement of claim 12 wherein said free radical polymerization catalyst is a metallic salt of sulfinic acid and said accelerator is a polymerizable carboxylic acid, said metallic salt of sulfinic acid and polymerizable carboxylic acid being present in amounts of about 0.4 to 1.0 and about 2.0 to 10.0% by weight, respectively.

17. A dental cement prepared by mixing and polymerizing a composition comprising:
  (A) a solid phase consisting essentially of an ultraviolet light sensitizer and
  (B) a liquid phase comprising:
    (1) from about 25 to about 35% by weight of a solid adduct of 2,2'-propane bis (3-(4-phenoxy)-1,2 - hydroxy propane - 1 - methacrylate) and a mono- or diisocyanate;
    (2) about 35 to about 45% by weight of 2,2'-propane bis [3-(4-phenoxy)-1,2-hydroxy propane-1-methacrylate]; and
  (C) about 25 to about 35% by weight of a dentally acceptable polymerizable solvent selected from esters of acrylic acid and methacrylic acid.

18. The dental cement of claim 17 wherein said mono- or diisocyanate comprises an alkylene or aromatic diisocyanate.

19. The dental cement of claim 18 wherein said mono- or diisocyanate comprises hexamethylene diisocyanate.

20. A dental cavity liner prepared by mixing and polymerizing a composition consisting essentially of:
  (A) a powder phase comprising a solid adduct of 2,2'-propane bis (3-(4-phenoxy)-1,2-hydroxy propane-1-methacrylate) and a mono- or diisocyanate; and
  (B) a liquid phase comprising a dentally acceptable polymerizable solvent selected from esters of acrylic acid and methacrylic acid;
  said solid phase containing a free radical polymerization catalyst, and said liquid phase containing an accelerator system, the weight ratio of solid and liquid being from about 1:2 to about 3:1.

21. The dental cavity liner of claim 20 wherein said mono- or diisocyanate comprises an alkylene or aromatic diisocyanate.

22. The dental cavity liner of claim 21 wherein said mono- or diisocyanate comprises hexamethylene diisocyanate.

23. The dental cavity liner of claim 20 wherein said free radical polymerization catalyst is an organic peroxide and said accelerator is a tertiary amine, said peroxide and amine being present in amounts of up to about 1.0% by weight.

24. The dental cavity liner of claim 20 wherein said free radical polymerization catalyst is a metallic salt of sulfinic acid and said accelerator is a polymerizable carboxylic acid, said metallic salt of sulfinic acid and polymerizable carboxylic acid being present in amounts of up to about 5.0 and about 20.0% by weight, respectively.

25. The dental cavity liner of claim 20 wherein the liquid phase contains from about 20% to about 75% by weight thereof of 2,2'-propane bis (3-(4-phenoxy)-1,2-hydroxy propane-1-methacrylate).

26. The dental cavity liner of claim 20 wherein the liquid phase contains from about 20 to about 75% by weight thereof of a liquid adduct of 2,2'-propane bis (3-(4-phenoxy)-1,2-hydroxy propane-1-methacrylate) and a mono- or diisocyanate.

27. A dental lacquer prepared by polymerizing a composition consisting essentially of:
(A) a liquid phase comprising
  (1) from about 40 to 80% by weight of a liquid adduct of 2,2'-propane bis (3-(4-phenoxy)-1,2-hydroxy propane-1-methacrylate) and a mono- or diisocyanate; and
  (2) from about 20 to 60% by weight of a dentally acceptable polymerizable solvent selected from esters of acrylic acid and methacrylic acid.

28. The dental lacquer of claim 27 wherein said mono- or diisocyanate comprises an alkylene or aromatic diisocyanate.

29. The dental lacquer of claim 28 wherein said mono- or diisocyanate comprises hexamethylene diisocyanate.

References Cited
UNITED STATES PATENTS

| | | | |
|---|---|---|---|
| 3,028,367 | 4/1962 | O'Brien | 260—77.5 |
| 3,194,783 | 7/1965 | Bowen | 260—41 |
| 3,254,411 | 6/1966 | Shelley | 32—15 |

ALLAN LIEBERMAN, Primary Examiner

J. H. DERRINGTON, Assistant Examiner

U.S. Cl. X.R.

32—15; 260—41 AG, 47 CB, 47 UA, 239.3 R, 471 C